(12) United States Patent
Nakhaei Sarvedani

(10) Patent No.: US 10,795,360 B2
(45) Date of Patent: Oct. 6, 2020

(54) UTILITY DECOMPOSITION WITH DEEP CORRECTIONS

(71) Applicant: Honda Motor Co., Ltd., Tokyo (JP)

(72) Inventor: Alireza Nakhaei Sarvedani, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 15/947,113

(22) Filed: Apr. 6, 2018

(65) Prior Publication Data

US 2019/0310632 A1 Oct. 10, 2019

(51) Int. Cl.
| | |
|---|---|
| *G05D 1/00* | (2006.01) |
| *B60W 30/095* | (2012.01) |
| *G06K 9/00* | (2006.01) |
| *G06N 7/00* | (2006.01) |
| *G06N 20/00* | (2019.01) |

(52) U.S. Cl.
CPC .......... *G05D 1/0088* (2013.01); *B60W 30/095* (2013.01); *G06K 9/00805* (2013.01); *G06N 7/005* (2013.01); *G06N 20/00* (2019.01); *B60W 2520/10* (2013.01); *B60W 2554/00* (2020.02); *B60W 2554/4041* (2020.02); *B60W 2554/804* (2020.02)

(58) Field of Classification Search
CPC ... G05D 1/0088; G06N 20/00; B60W 30/095; G06K 9/00805
USPC .......................................................... 701/27
See application file for complete search history.

(56) References Cited

U.S. PATENT DOCUMENTS

2018/0286220 A1* 10/2018 Fowe ............... G08G 1/096844
2019/0035275 A1* 1/2019 Nishi .................... G01S 5/0072

OTHER PUBLICATIONS

Mykel J. Kochenderfer. 2015. Decision Making Under Uncertainty: Theory and Application—Chapter 5: Model Uncertainty. MIT Press, pp. 113-132.
Haoyu Bai, David Hsu, and Wee Sun Lee. 2014. Integrated perception and planning in the continuous space: A POMDP approach. International Journal of Robotics Research 33, 9, 1288-1302.

(Continued)

*Primary Examiner* — Isaac G Smith
(74) *Attorney, Agent, or Firm* — Rankin, Hill & Clark LLP

(57) ABSTRACT

One or more aspects of utility decomposition with deep corrections are described herein. An entity may be detected within an environment through which an autonomous vehicle is travelling. The entity may be associated with a current velocity and a current position. The autonomous vehicle may be associated with a current position and a current velocity. Additionally, the autonomous vehicle may have a target position or desired destination. A Partially Observable Markov Decision Process (POMDP) model may be built based on the current velocities and current positions of different entities and the autonomous vehicle. Utility decomposition may be performed to break tasks or problems down into sub-tasks or sub-problems. A correction term may be generated using multi-fidelity modeling. A driving parameter may be implemented for a component of the autonomous vehicle based on the POMDP model and the correction term to operate the autonomous vehicle autonomously.

20 Claims, 7 Drawing Sheets

(56) References Cited

OTHER PUBLICATIONS

Tirthankar Bandyopadhyay, Kok Sung Won, Emilio Frazzoli, David Hsu, Wee Sun Lee, and Daniela Rus. 2012. Intention-Aware Motion Planning. In Algorithmic Foundations of Robotics X. 475-491.
Sebastian Brechtel, Tobias Gindele, and Rüdiger Dillmann. 2014. Probalistic decision-making under uncertainty for autonomous driving using continuous POMDPs. In IEEE International Conference on Intelligent Transporation Systems (ITSC). 392-399.
James P. Chryssanthacopoulos and Mykel J. Kochenderfer. 2012. Decomposition methods for optimized collision avoidance with multiple threats. AIAA Journal of Guidance, Control, and Dynamics 35, 2, 398-405.
Mark Cutler, Thomas J. Walsh, and Jonathan P. How. 2015. Real-world reinforcement learning via multifidelity simulators. IEEE Transactions on Robotics 31, 3, 655-671.
Peter Dayan and Geoffrey E. Hinton. 1992. Feudal Reinforcement Learning. In Advances in Neural Information Processing Systems (NIPS). 271-278.
Michael Eldred and Daniel Dunlavy. 2006. Formulations for Surrogate-Based Optimization with Data Fit, Multifidelity, and Reduced-Order Models. AIAA/ISSMO Multidisciplinary Analysis and Optimization Conference.
Martin Gottwald, Dominik Meyer, Hao Shen, and Klaus Diepold. 2017. Learning to walk with prior knowlege. In IEEE International Conference on Advanced Intellegent Mechatronics (AIM). 1369-1374.
Shixiang Gu, Ethan Holly, Timothy P. Lillicrap, and Sergey Levine. 2017. Deep reinforcement learning for robotic manipulation with asynchronous off-policy updates. In IEEE International Conference on Robotics and Automation (ICRA). 3389-3396.
Ziyu Wang, Tom Schaul, Matteo Hessel, Hado van Hasselt, Marc Lanctot, and Nando de Freitas. 2016. Dueling Network Architectures for Deep Reinforcement Learning. In International Conference on Machine Learning (ICML). 1995-2003.
Volodymyr Mnih, Koray Kavukcuoglu, David Silver, Andrei A. Rusu, Joel Veness, Marc G. Bellemare, Alex Graves, Martin A. Riedmiller, Andreas Fidjeland, Georg Ostrovski, Stig Petersen, Charles Beattie, Amir Sadik, Ioannis Antonoglou, Helen King, Dharshan Kumaran, Daan Wierstra, Shane Legg, and Demis Hassabis. 2015. Human-level contol through deep reinforcement learning. Nature 518, 7540, 529-533.
Frans A. Oliehoek, Matthijs TJ Spaan, and Nikos Vlassis. 2008. Optimal and approximate Q-value functions for decentralized POMDPs. Journal of Artificial Intelligence Research 32 (2008), 289-353.
Hao Yi Ong and Mykel J. Kochenderfer. 2015. Short-term conflict resolution for unmanned aircraft management. In Digital Avionics Systems Conference (DASC). 5A4-1-5A4-13.
Dev Rajnarayan, Alex Haas, and Ilan Kroo. 2008. A Multifidelity Gradient-Free Optimization Method and Application to Aerodynamic Deisng. AIAA/ISSMO Multidisciplinary Analysis and Optimization Conference.
Julio K. Rosenblatt. 2000. Optimal selection of uncertain actions by maximizing expected utility. Autonomous Robots 9,1 (2000), 17-25.
Stuart J. Russell and Andrew Zimdars. 2003. Q-Decomposition for Reinforcement Learning Agents. In International Conference on Machine Learning (ICML). 656-663.
Tom Schaul, John Quan, Ioannis Antonoglou, and David Silver. 2016. Prioritized Experience Replay. In International Conference on Learning Representations (ICLR).
Tom Schaul, John Quan, Ioannis Antonoglou, and David Silver. 2016. Prioritized experience replay. International Conference on Learning Representations (ICLR).
William D. Smart and Leslie Pack Kaelbling. 2002. Effective reinforcement learning for mobile robots. In IEEE International Conference on Robotics and Automation (ICRA). 3404-3410 vol. 4.
Richard S. Sutton and Andres G. Barto. 1998. Reinforcement learning—an introduction. MIT Press.
Hado Van Hasselt, Arthur Guez, and David Silver. 2016. Deep Reinforcement Learning with Double Q-Learning. In AAAI Conference on Artificial Intelligence (AAAI). 2094-2100.

\* cited by examiner

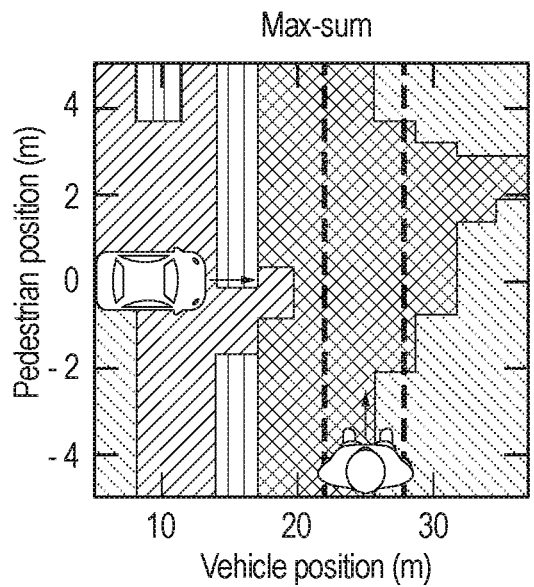
FIG. 3A
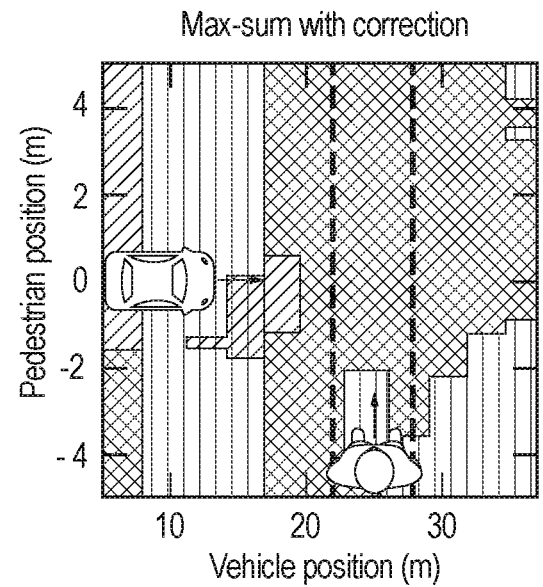
FIG. 3B
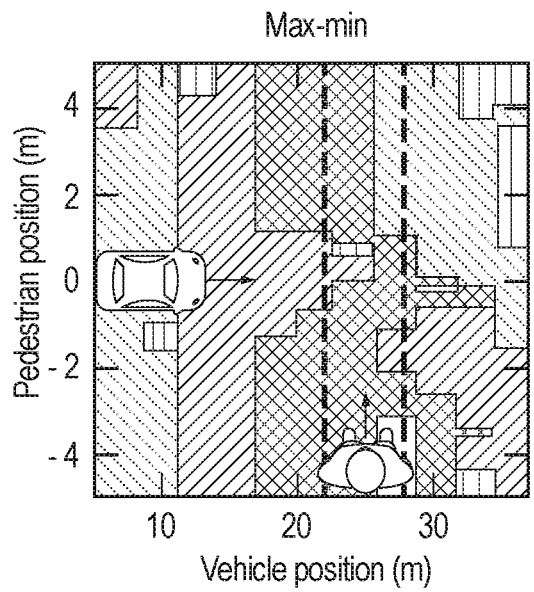
FIG. 4A
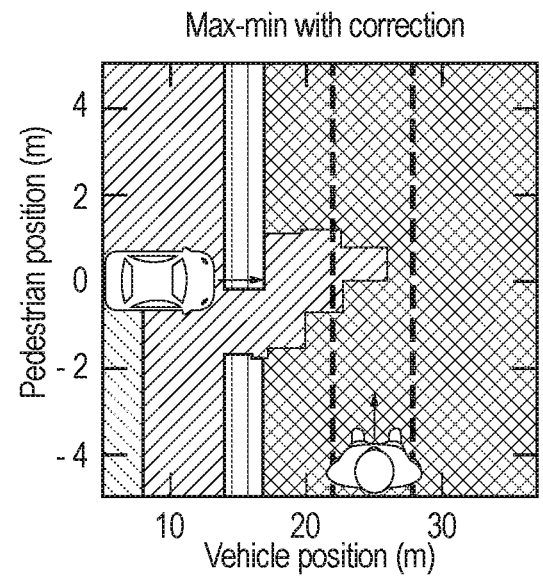
FIG. 4B
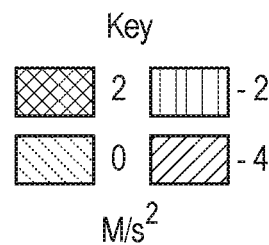

UTILITY DECOMPOSITION WITH DEEP CORRECTIONS

BACKGROUND

Designing decision making systems or decision making strategies for autonomous systems, such as autonomous vehicles may be challenging. For example, dimensionality may make it difficult to scale a solution because a size of a state space may grow exponentially with a number of state dimensions. When the state space is too large to fully solve, simplifications are often made. However, these simplifications may result in sub-optimal solutions.

BRIEF DESCRIPTION

According to one aspect, an autonomous vehicle may include a system for utility decomposition. The system may include a sensor, a controller, a model generator, a decomposition unit, a correction generator, and a drive controller. The sensor may detect a first entity within an environment through which the autonomous vehicle is travelling, a first current velocity associated with the first entity, and a first current position associated with the first entity and a second entity within the environment, a second current velocity associated with the second entity, and a second current position associated with the second entity. The controller may receive a current velocity associated with the autonomous vehicle, a current position associated with the autonomous vehicle, and a target position for the autonomous vehicle. The model generator may build a Partially Observable Markov Decision Process (POMDP) model of the environment based on the first current velocity of the first entity, the first current position of the first entity, the second current velocity of the second entity, the second current position of the first entity, the current velocity of the autonomous vehicle, and the current position of the autonomous vehicle. The decomposition unit may decompose a task associated with travelling from the current position associated with the autonomous vehicle to the target position into a first sub-task associated with the first entity and a second sub-task associated with the second entity and solving respective sub-tasks individually. The correction generator may generate a correction term based on a low-fidelity model associated with prior knowledge and a surrogate correction. The drive controller may implement a driving parameter for a component of the autonomous vehicle based on the POMDP model and the correction term.

The controller may assign an $s_{absent}$ value to the first current velocity of the first entity and the first current position of the first entity based on the sensor detecting that the first entity is occluded from view. The model generator may build the POMDP model based on a k-Markov approximation. The model generator builds the POMDP model as a tuple (S, $\mathcal{A}$, T, $\mathcal{R}$, γ), wherein S is a state space, $\mathcal{A}$ is an action space, T is a state transition function, $\mathcal{R}$ is a reward function, and γ is a discount factor.

The state space may include the first current velocity of the first entity, the first current position of the first entity, the second current velocity of the second entity, the second current position of the first entity, the current velocity of the autonomous vehicle, and the current position of the autonomous vehicle. The action space is a set of actions may include a hard braking action, a moderate braking action, maintaining velocity, and an acceleration action. The state transition function T may be modeled as a transition model based on a point mass model for the autonomous vehicle and a constant velocity model with random noise for the respective first and second entities.

The decomposition unit may approximates a value function associated with the task based on summing one or more individual value functions or based on selecting a minimum associated with each entity. The value function may be represented by a deep Q-network (DQN). The sensor may be a light detection and ranging (LIDAR) sensor or an image capture sensor.

According to one aspect, an autonomous vehicle may include a system for utility decomposition. The system may include a sensor, a controller, a model generator, a decomposition unit, a correction generator, and a drive controller. The sensor may detect a first entity within an environment through which the autonomous vehicle is travelling, a first current velocity associated with the first entity, and a first current position associated with the first entity. The controller may receive a current velocity associated with the autonomous vehicle, a current position associated with the autonomous vehicle, and a target position for the autonomous vehicle. The model generator may build a Partially Observable Markov Decision Process (POMDP) model of the environment based on the first current velocity of the first entity, the first current position of the first entity, the current velocity of the autonomous vehicle, and the current position of the autonomous vehicle. The decomposition unit may decompose a task associated with travelling from the current position associated with the autonomous vehicle to the target position into a first sub-task associated with the first entity and a second sub-task associated with the second entity and solving respective sub-tasks individually. The correction generator may generate a correction term based on a low-fidelity model associated with prior knowledge and a surrogate correction. The drive controller may implement a driving parameter for a component of the autonomous vehicle based on the POMDP model and the correction term.

The controller may assign an $s_{absent}$ value to the first current velocity of the first entity and the first current position of the first entity based on the sensor detecting that the first entity is occluded from view. The model generator may build the POMDP model based on a k-Markov approximation. The model generator builds the POMDP model as a tuple (S, $\mathcal{A}$, T, $\mathcal{R}$, γ), wherein S is a state space, $\mathcal{A}$ is an action space, T is a state transition function, $\mathcal{R}$ is a reward function, and γ is a discount factor.

The state space may include the first current velocity of the first entity, the first current position of the first entity, the second current velocity of the second entity, the second current position of the first entity, the current velocity of the autonomous vehicle, and the current position of the autonomous vehicle. The action space is a set of actions may include a hard braking action, a moderate braking action, maintaining velocity, and an acceleration action.

According to one aspect, a method for utility decomposition with deep corrections may include detecting a first entity within an environment through which an autonomous vehicle is travelling, a first current velocity associated with the first entity, and a first current position associated with the first entity, receiving a current velocity associated with the autonomous vehicle, a current position associated with the autonomous vehicle, and a target position for the autonomous vehicle, building a Partially Observable Markov Decision Process (POMDP) model of the environment based on the first current velocity of the first entity, the first current position of the first entity, the current velocity of the autonomous vehicle, and the current position of the autonomous vehicle, decomposing a task associated with travelling from the current position associated with the autonomous vehicle to the target position into a first sub-task and a second sub-task and solving respective sub-tasks individually, generating a correction term based on a low-fidelity model associated with prior knowledge and a surrogate correction, and implementing a driving parameter for a component of the autonomous vehicle based on the POMDP model and the correction term to operate the autonomous vehicle autonomously.

The method may include assigning an $s_{absent}$ value to the first current velocity of the first entity and the first current position of the first entity based on the sensor detecting that the first entity is occluded from view, building the POMDP model based on a k-Markov approximation, or building the POMDP model as a tuple (S, $\mathcal{A}$, T, $\mathcal{R}$, γ), wherein S is a state space, $\mathcal{A}$ is an action space, T is a state transition function, $\mathcal{R}$ is a reward function, and γ is a discount factor.

BRIEF DESCRIPTION OF THE DRAWINGS

FIGS. 3A-3B are graphical representations of exemplary policies or rules derived from utility decomposition, as implemented by the system for utility decomposition with deep corrections of FIG. 1, according to one aspect.

FIGS. 4A-4B are graphical representations of exemplary policies or rules derived from utility decomposition, as implemented by the system for utility decomposition with deep corrections of FIG. 1, according to one aspect.

DETAILED DESCRIPTION

Figure 1:
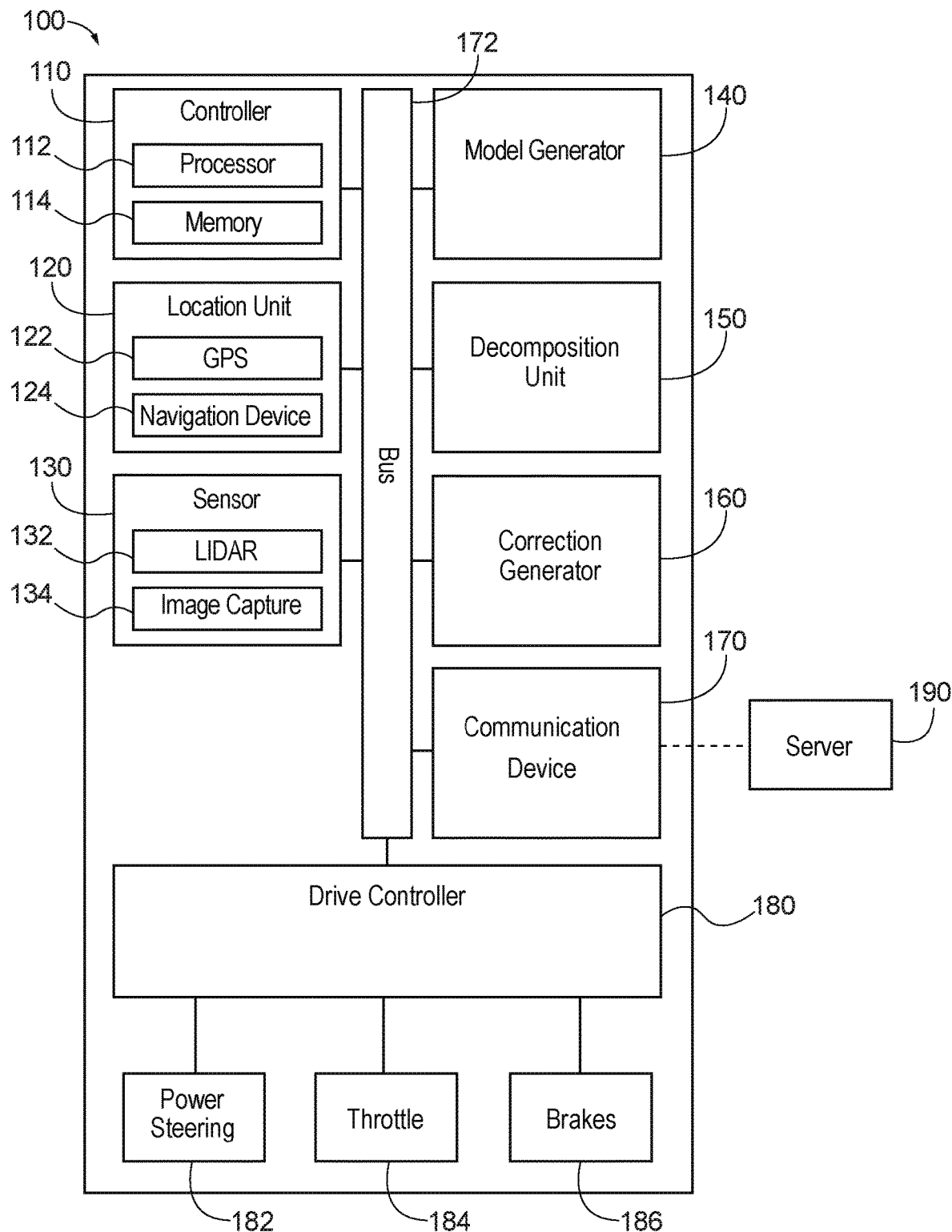
FIG. 1 is a component diagram of an autonomous vehicle equipped with an exemplary system for utility decomposition with deep corrections.

The following terms are used throughout the disclosure, the definitions of which are provided herein to assist in understanding one aspect of the disclosure.

"Vehicle", as used herein, refers to any moving vehicle that is capable of carrying one or more human occupants and is powered by any form of energy. In some cases, a motor vehicle includes one or more engines. The term "vehicle" may also refer to an autonomous vehicle and/or self-driving vehicle powered by any form of energy. The autonomous vehicle may carry one or more human occupants or other cargo. Further, the term "vehicle" may include vehicles that are automated or non-automated with pre-determined paths or free-moving vehicles.

"Entity", as used herein, refers to any objects or obstacles in a roadway or along a path being travelled by the vehicle and may include pedestrians, other vehicles, animals, debris, potholes, etc. Further, an 'obstacle' may include most any traffic condition, road condition, weather condition, features of the environment, etc. Examples of obstacles may include, but are not necessarily limited to other vehicles (e.g., obstacle vehicle), buildings, landmarks, obstructions in the roadway, road segments, intersections, etc. Thus, obstacles may be found, detected, or associated with a path, one or more road segments, etc. along a route on which the vehicle is travelling or is projected to travel along.

"Module", as used herein, includes, but is not limited to, a non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may include logic, a software controlled microprocessor, a discrete logic circuit, an analog circuit, a digital circuit, a programmed logic device, a memory device containing executing or executable instructions, logic gates, a combination of gates, and/or other circuit components, such as the modules, systems, devices, units, or any of the components of FIG. 1. Multiple modules may be combined into one module and single modules may be distributed among multiple modules.

"Bus", as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area Network (CAN), Local Interconnect network (LIN), among others.

"Communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Operable connection", as used herein, or a connection by which entities are "operably connected", is one in which signals, physical communications, and/or logical communications may be sent and/or received. An operable connection may include a wireless interface, a physical interface, a data interface, and/or an electrical interface. For example, one or more of the components of FIG. 1 may be operably connected with one another, thereby facilitating communication therebetween.

"Infer" or "inference", as used herein, generally refers to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is a component diagram of an autonomous vehicle equipped with an exemplary system 100 for utility decomposition with deep corrections. The system 100 may include a controller 110, a location unit 120, a sensor 130, a model generator 140, a decomposition unit 150, a correction generator 160, a communication device 170, and a drive controller 180. A bus 172 may interconnect the controller 110, the location unit 120, the sensor 130, the model generator 140, the decomposition unit 150, the correction generator 160, the communication device 170, and the drive controller 180. The controller 110 may include a processor 112 and a memory 114 which stores one or more instructions to be executed by the processor 112. The location unit 120 may include a global positioning system (GPS) antenna 122 and a navigation device 124. The navigation device 124 may provide a navigation route associated with a target position for the autonomous vehicle. The sensor 130 may include a light detection and ranging (LIDAR) sensor 132 and an image capture sensor 134. The drive controller 180 may control a power steering mechanism 182, a throttle mechanism 184, and a brake mechanism 186 based on outputs of the model generator 140, the decomposition unit 150, and the correction generator 160.

The location unit 120 or the GPS 122 may receive information associated with the autonomous vehicle, such as a current position of the autonomous vehicle. According to one aspect, a current velocity of the autonomous vehicle may be calculated based on measurements of the position of the autonomous vehicle over a period of time. According to another aspect, the controller or the drive controller 180 may receive the current velocity of the autonomous vehicle. The current velocity and the current position of the autonomous vehicle may be passed to the model generator 140 which may use these parameters to generate a model (e.g., Markov Decision Process (MDP) or Partially Observable Markov Decision Process (POMDP)) based thereon.

The sensor 130 of the autonomous vehicle may sense or detect one or more entities within an environment through which the autonomous vehicle is travelling. An entity, for example, may be an object, an obstacle, a pedestrian, a cyclist, another vehicle, etc. As previously discussed, the sensor 130 may be a LIDAR sensor 132 or an image capture sensor 134, although other types of sensors may also be utilized. The sensor 130 may receive information associated with one or more of the entities, such as a first entity, a second entity, a third entity, etc. Based on the information received from the sensor 130, a current position and a current velocity may be determined for one or more of the entities. For example, the controller 110 may determine a first current position and a first current velocity for the first entity, a second current position and a second current velocity for the second entity, a third current position and a third current velocity for the third entity, etc.

In this way, the current position and the current velocity of each entity may be received from the sensor 130 of the autonomous vehicle. In other words, the sensor 130 of the autonomous vehicle may sense or detect the current position and the current velocity (among other aspects or characteristics associated with the entities within the environment) for each entity within the environment, while the controller 110 may receive characteristics associated with the autonomous vehicle, such as the current position and the current velocity. The current velocity and the current position of the different entities (e.g., first entity, second entity, third entity, etc.) may be passed to the model generator 140 which may use these parameters to generate the MDP model or the POMDP model based thereon.

According to one aspect, the sensor 130 may track or detect when one of the entities becomes obscured or occluded. For example, this may occur when the sensor 130 of the autonomous vehicle becomes occluded from a field of view by a physical obstacle, as will be described with reference to FIG. 2. Contrary to the Markov Decision Process, states within the POMDP model may not necessarily be fully observable. As discussed, the sensor 130 of the autonomous vehicle may become occluded from a field of view by a physical obstacle.

Partially Observable Markov Decision Process (POMDP) Model

The model generator 140 may generate or construct the POMDP model based on the current velocities and current positions of the autonomous vehicle and respective entities. Additionally, the POMDP model may include a value, state, or status for entities which are occluded from view or otherwise not visible. Therefore, the POMDP model may include representations and/or characteristics of the autonomous vehicle, one or more of the entities within the environment through which the autonomous vehicle is travelling, and interactions therebetween. Stated another way, the POMDP model may include representations of objects themselves (e.g., the autonomous vehicle and entities, such as pedestrians or occlusion objects which block the view of the pedestrians from the sensor 130 of the autonomous vehicle) and characteristics associated with these objects, such as velocity and position over a period of time (e.g., time steps or time frames).

The POMDP model may built by the model generator 140 such that each entity within the environment is considered independently. In other words, sequential problems (e.g., determining one or more driving parameters for components or mechanisms of the autonomous vehicle to mitigate collisions with one or more of the entities) may be decomposed into individual sub-problems. Further, each sub-problem may be associated with a value function. As described herein, a problem may be referred to as a task and a sub-problem as a sub-task. The POMDP model may be used to simulate (e.g., using the controller 110 or a remote server 190 via the communication device 170) different reactions (e.g., the actions of the action space described below) which may be taken by the autonomous vehicle in reaction to the different entities.

Although one or more acts or functions are described with reference to the controller 110, the model generator 140, the decomposition unit, and the correction generator 160, it will be appreciated that these acts or functions may be performed off-board the autonomous vehicle, such as on the server. Stated another way, according to one aspect, the model generator 140, the decomposition unit, and the correction generator 160 may be remote from the system 100 for utility decomposition with deep corrections.

The model generator 140 may construct, formulate, or build the POMDP model as a tuple (S, $\mathcal{A}$, T, $\mathcal{R}$, γ) where S is a state space, $\mathcal{A}$ is an action space, T is a state transition function, $\mathcal{R}$ is a reward function, and γ is a discount factor. The state space S may be a state of the environment and include the current position of the autonomous vehicle, the current velocity of the autonomous vehicle, the first current position of the first entity within the environment, and the first current velocity of the first entity within the environment. As previously discussed, the current velocity and the current position of the autonomous vehicle may be received from the controller 110 or the drive controller 180, the GPS 122, and/or the location unit 120.

Additionally, the POMDP model may include an indication, a value, or a flag indicative of an entity when not visible. In other words, if an entity is visible, but then moves behind an occlusion object and become occluded so that there is no line of sight between the sensor 130 of the autonomous vehicle and the entity, that entity may be assigned an $s_{absent}$ value, which may be a constant value indicative that the entity or pedestrian is not currently visible. Stated another way, when the entity or pedestrian is not observed, the current position and the current velocity of the pedestrian may be flagged or set to the constant value which is indicative that the pedestrian is not observable. According to one aspect, the model generator 140 may implement a recurrent neural network to handle the partial observability of the entity, rather than assigning the $s_{absent}$ value to that pedestrian or entity. According to another aspect, the model generator 140 may approximate the POMDP structure based on a k-Markov approximation for a MDP where the state includes the last k observations: $s_t = o_{t-k}, o_{t-k+1}, \ldots, o_t$.

The action space $\mathcal{A}$ may include a set of actions such as a hard braking action, a moderate braking action, maintaining velocity, an acceleration action, etc. For example, this may be represented as a set of acceleration inputs for the drive controller 180 {−4 m/s², −2 m/s², 0 m/s², 2 m/s²}.

The state transition function T may be modeled as a transition model based on a point mass model for the autonomous vehicle and a constant velocity model with random noise for the entity. The constant velocity model with random noise for the entity means that the entity or pedestrian may be modeled to be associated with a random amount of movement or velocity {−1 m/s, 0 m/s, 1 m/s} at each time step.

At time t, the controller 110 may determine an action $a_t \in \mathcal{A}$ based on observing state $s_t \in S$. The controller 110 may associate a reward $r_t = R(s_t, a_t)$ with the selected action. The reward may be determined when the autonomous vehicle reaches a terminal state, such as a collision state, a time out, or a success state.

At time t+1 (e.g., after one time step), the controller 110 may step through the simulation associated with the POMDP model from a first state $s_t$ to a second state $s_{t+1}$ with a probability $Pr(s_{t+1}|s_t,a_t)=T(s_{t+1},s_t,a_t)$. The POMDP model may be built based on maximizing an accumulated expected discounted reward given by $\Sigma_{t=0}^{\infty} \gamma^t r_t$.

For example, the collision state may be indicative of a collision between the autonomous vehicle and the entity and the corresponding reward for the collision state may be a penalty of −1. The time out may be a state which occurs if the autonomous vehicle fails to progress past a predetermined position within a threshold time frame, such as twenty seconds, for example. The associated reward for the time out may be 0. The success state may be indicative of the autonomous vehicle reaching a target position without any collision states occurring and the corresponding reward for the success state may be 1.

The controller 110 may define a policy ($\pi: S \mapsto \mathcal{A}$) which defines an action for the drive controller 180 to execute at a given state. The action may include an implementation of a driving parameter, such as a velocity, an acceleration, a trajectory, a steering angle, a throttle angle, a braking action, etc. Each policy may be associated with a state-action value function (herein value function) $Q^\pi: S \times \mathcal{A} \mapsto \mathbb{R}$ which represents an expected discounted value of following or implementing the policy $\pi$.

According to one aspect, the discount factor $\gamma$ may be set to 0.99 and setup to incentivize movement of the autonomous vehicle efficiently by having the reward decay with time. In this way, the reward function $\mathcal{R}$ may be evaluated based on different metrics. For example, the reward function $\mathcal{R}$ may be evaluated based on a collision rate within the simulation run by the controller 110. As another example, the reward function $\mathcal{R}$ may be evaluated based on an amount of time it takes for the autonomous vehicle to reach a target position (e.g., cross a crowded crosswalk). Therefore, the reward function $\mathcal{R}$ may balance safety and efficiency. According to one aspect, Pareto optimality may be utilized to determine whether a first policy is to be selected over a second policy during training or simulation.

In some scenarios, the transition function T may not be directly available. In this regard, the controller 110 may access a generative model from which a next state is sampled. The model generator 140 may build the POMDP model according to an expectation over the next state (Bellman equation):

$$Q^*(s, a) = \mathbb{E}_{s'}[R(s, a) + \gamma_{a'}^{max} Q(s', a')] \quad (1)$$

When Q* is calculated, a corresponding optimal policy is represented by $\pi^*(s) = \arg\max_a Q^*(s,a)$. Similarly, a utility of a given state may be defined as $U^*(s) = \max_a Q^*(s,a)$.

Utility Decomposition

The decomposition unit 150 may perform utility decomposition or Q-decomposition (herein decomposition) on the POMDP model. In other words, the decomposition unit 150 may combine one or more value functions associated with a decision making task (e.g., travelling from the current position to the target position) to approximate a solution to a more complex, global task. Stated another way, the decomposition unit 150 uses utility decomposition to enable approximate solutions for large sequential decision making problems to be determined by breaking large tasks into individual tasks.

A task, for example, may include (e.g., determining the driving parameter for the component of the autonomous vehicle for a time frame or time step). The task may be decomposed into one or more sub-tasks by the decomposition unit 150. Each sub-task i may be formed as a MDP and solved in isolation by the decomposition unit 150. The function of $Q_i^*$ may represent an optimal value function for solving the sub-task i, (e.g., how the autonomous vehicle should react to that particular entity). Stated another way, the decomposition unit 150 may observe a state $s_i$ for each entity i within the environment. The state $s_i$ may include the position and velocity associated with the entity i.

For example, when the global task or the problem is determining the driving parameter for the component of the autonomous vehicle to mitigate collisions with respect to an entity, and a goal of the system 100 for utility decomposition with deep corrections is to mitigate collisions with entities, the decomposition unit 150 may build the POMDP model based on utility decomposition so that the POMDP model includes the autonomous vehicle, a first entity, and a second entity. However, based on the utility decomposition approach, the decomposition unit 150 may decompose the global task of collision mitigation into a first sub-task of collision mitigation with respect to the first entity and a second sub-task of collision mitigation with respect to the second entity. In this way, if the autonomous vehicle learns a strategy to mitigate a collision with a single pedestrian, the decomposition unit 150 may utilize decomposition to scale the strategy associated with the single pedestrian to mitigate collisions with multiple pedestrians.

The decomposition unit 150 may solve these two sub-tasks individually. In other words, the decomposition unit 150 may calculate the value associated with mitigating collision with each entity i under the assumption that the entity i is the only entity to be avoided. Because the decomposition unit 150 calculates these values or functions individually (e.g., based on the autonomous vehicle and entity$_i$), the interaction between the autonomous vehicle and each entity is considered pairwise. Solving for pairwise interactions rather than the global problem or task provides the benefit of requiring exponentially less computations than solving on the whole since the size of the state space may grow exponentially with the number of entities within the environment.

Utility Fusion

In a non-cooperative multi-agent (e.g., multi-vehicle) setting, these sub-tasks are pairwise interactions (e.g., the interaction is merely between the autonomous vehicle and an entity or obstacle, considered one at a time). The global task may be solved by fusing utilities associated with each sub-task based on a fusion function. Stated another way, value functions may be combined using utility fusion to approximate a value function associated with a global task (e.g., associated with the sequential problems). This value function may be a global value function. This global value function may not necessarily be optimal, but provides an approximation of a global policy at a low or minimum cost. This may be defined by a function $f$ such that:

$$Q^*(s,a) \approx f(Q_1^*(s_1,a), \ldots, Q_n^*(s_n,a)) \qquad (2)$$

The function of Q* may represent the optimal value function for solving the global task. The state variable may also be decomposed by the decomposition unit 150 and it may be assumed that each of the value functions $Q_i^*$ uses a subset of the information of s to solve simpler sub-tasks. For example, the reward function may be decomposed additively and each term may be optimized individually by a sub-agent. In this regard, $f$ may be set as the sum of the individual value functions. These individual value functions may be combined based on utility fusion to approximate the value function associated with the global task, thereby scaling the solution. The global utility may be calculated by summing the individual value functions and/or by taking the minimum over each entity to avoid:

$$Q^*(s, a) \approx \sum_i Q_i^*(s_i, a) \qquad (3a)$$

$$Q^*(s, a) \approx \min_i Q_i^*(s_i, a) \qquad (3b)$$

By summing the individual value functions of each entity, it is assumed that the entities or obstacles are independent of one another. Equation 3a weighs the utility of the autonomous vehicle and/or the entities regardless of the position of each within different areas of the environment. Equation 3b considers the entity associated with the lowest utility by taking the minimum. In any event, the decomposition unit 150 may calculate $Q^*(s_i,a)$ while considering i independently of other entities. Stated another way, the decomposition unit 150 may calculate $Q^*(s_i,a)$ based on an assumption that i is the only entity present within the environment.

The reward function may penalize collisions, and due to the pairwise setup of the POMDP, the decomposition unit 150 may merely consider the entity with which the autonomous vehicle may collide based on action a, thereby providing collision mitigation. The action a may be defined by arg max$_a f(Q_1^*(s_1, a), \ldots, Q_n^*(s_n,a))$. As discussed herein, Equation 3a may be referred to as the max-sum equation and Equation 3B may be referred to as the max-min equation.

The decomposition unit 150 may determine a state-action value and measure an expected accumulated reward of taking an action a and following an optimal policy associated with entity i. The decomposition unit 150 may calculate an approximation to the global value function based on Equation 2 and combine the value functions provided by Equation 3a and Equation 3b.

One or more different fusion functions may be selected by the decomposition unit 150. The fusion function may be a function which arbitrates between different utilities being considered. For example, the fusion function may be a function which provides a low-fidelity approximation of the optimal value function at a low computational cost once the individual utility functions (e.g., value functions) are calculated.

The value function may be represented by a parametric model, such as a neural network. For example, this may be a deep Q-network (DQN): $Q(s,a; \theta)$. In this way, the values of all possible states may be approximated based on a limited number of parameters $\theta$. An objective loss function to minimize may be determined based on Equation (1):

$$J(\theta) = \mathbb{E}_{s'}[(r + \gamma_{a'}^{max}Q(s', a'; \theta_-) - Q(s, a; \theta))^2] \qquad (4)$$

The loss function may be calculated and minimized based on a sampled experience by the controller 110. The sampled experience may be an interaction (e.g., simulated) between the autonomous vehicle and the environment or entities within the environment during a time step or time interval. For example, the sampled experience may be an interaction between the autonomous vehicle and the environment during the time step while in state s, taking action a, transitioning to state s', and receiving reward r. Thus, the experience may be defined as (s, a, r, s'). In this way, the controller 110 may calculate the parameters $\theta$ for the DQN $Q(s, a; \theta)$. The action a is selected based on a $\epsilon$-greedy strategy. The parameter $\theta_-$ may define a fixed target network, thereby facilitating convergence. If Q satisfies the Bellman equation, the loss is zero. By taking the gradient of J with respect to the parameters $\theta$ and given an experience (s,a,r,s'), the following rule may be generated:

$$\theta \leftarrow \theta + \alpha(r + \gamma_{a'}^{max}Q(s', a'; \theta_-) - Q(s, a; \theta))\nabla_\theta Q(s, a; \theta) \qquad (5)$$

In Equation 5, $\alpha$ is a learning rate, which is a hyperparameter. Calculating the optimal Q function based on the DQN may be performed by gathering a number of experience samples which may be achieved by performing random exploration. However, while a number of experience samples may be used to converge, train, or tune the model, prior knowledge may be introduced, thereby shortening the training time or number of experience samples during training. For example, double DQN, dueling network architectures, or prioritized experience replay may be implemented by the correction generator 160 to improve network training to reduce associated training times.

Deep Error Correction

The correction generator 160 may implement Q-learning in association with the POMDP model to solve the high-dimensional task of controlling the autonomous vehicle by using deep neural networks to model the value function. This value function may be indicative or may represent prior knowledge, which may be utilized to train the corresponding neural network or otherwise implement a deep correction or a policy correction as a rule. Stated another way, to minimize training time for the networks or modules the correction generator 160 may implement transfer learning by leveraging prior knowledge (e.g., approximated as the value function) to inform training and reduce the time associated with training.

Many different techniques may be utilized or implemented to approximate the value function. For example, the controller 110 or a human may gather high reward demonstrations to train the autonomous vehicle. As another example, the correction generator 160 may discretize a continuous state space or implement domain expertise, such as a physics based model. Other examples of approximation of the value function include approximation using the Monte Carlo evaluation algorithm. Regardless, the correction generator 160 may leverage the prior knowledge to learn an optimal value function using a minimal amount of computation resources as possible.

According to one aspect, the correction generator 160 may build two or more correction models associated with different fidelities. For example, the correction generator 160 may build a high-fidelity model ($f_{hi}$) and a low-fidelity model ($f_{lo}$). The high-fidelity model may provide a more accurate approximation of the value function than the low-fidelity model, but be more computationally expensive. Conversely, the low-fidelity model may provide a less accurate approximation of the value function than the high-fidelity model, but be computationally less expensive. Because of these attributes of the high-fidelity model ($f_{hi}$) and the low-fidelity model ($f_{lo}$), the correction generator 160 may build a surrogate model based on the forgoing. In other words, the correction generator 160 may build the surrogate model based on the high-fidelity model ($f_{hi}$) and the low-fidelity model ($f_{lo}$). The surrogate model may represent the difference between the high-fidelity model ($f_{hi}$) and the low-fidelity model ($f_{lo}$), and be represented by:

$$f_{hi}(x) \approx f_{lo}(x) + \delta(x) \quad (6)$$

In Equation 6, $\delta$ is a surrogate correction learned using a number of samples from ($f_{hi}$). $\delta$ may be a Gaussian process or a parametric model. While the exemplary surrogate correction herein is described as additive surrogate correction, other types of surrogate correction are contemplated, such as multiplicative surrogate correction. Additionally, a combination or weighted combination of additive surrogate correction and multiplicative surrogate correction may be implemented by the correction generator 160.

Correspondingly, $Q_{lo}$ is the low-fidelity approximation of the value function obtained from prior knowledge or from decomposition. The high-fidelity model may represent the optimal value function, and the surrogate correction for reinforcement learning may be described as:

$$Q^*(s,a) \approx Q_{lo}(s,a) + \delta(s,a;\theta) \quad (7)$$

The correction term may be calculated by the correction generator 160 based on multi-fidelity optimization. While samples from the high-fidelity model ($f_{hi}$) may be used to fit the correction model, if $Q^*(s,a)$ is unknown, a temporal difference approach may be utilized by the correction generator 160 to derive the learning rule or policy. For example, the correction generator 160 may minimize loss and parameterize a corrective portion. As a result, when taking the gradients with respect to the parameters, the updated rule becomes:

$$\theta \leftarrow \theta + \alpha[R(s, a) + \gamma_{a'}^{max}(Q_{lo}(s', a') + \delta(s, a; \theta_-)) - \\ Q_{lo}(s, a) - \delta(s, a; \theta)]\nabla_\theta \delta(s, a; \theta) \quad (8)$$

In this regard, if the low-fidelity approximation of the value function $Q_{lo}$ is a good approximation of the optimal policy, the updated rule may include a correction term which approaches zero. Additionally, a regularization term may be added to the loss function (Equation 4) to minimize the impact of the correction term if there is a high confidence level associated with $Q_{lo}$ the low-fidelity approximation. Stated another way, the correction term may be applied to the correction term.

In this way, the correction generator 160 may learn the correction term with the neural network representation, such as the additive correction term. Instead of learning a Q-value representing the full problem or task, the additive correction may be represented as the neural network. By using this correction term, double DQN, dueling network architectures, or prioritized experience replay may be implemented to improve and provide a deep correction for the DQN. In other words, prior knowledge may be provided as a trained neural network, while the regularization term may penalize a weight of a network in draining for differing from weights of the trained network associated with the prior knowledge. Although implementation of the correction term may provide similar results as solving for the full value function, learning the correction term is generally computationally less expensive than solving for the full value function. In this way, computing resources may be saved. Further, in other scenarios, computation of the full value function may require an amount of computing resources which are not available or require a long wait time.

The correction generator 160 may implement the correction term or the regularizing term to 'pull' the autonomous vehicle towards regions where there is knowledge of appropriate behavior. The correction term may act as a surrogate correction which is learned to improve an existing approximation of an optimal value function of the problem or task.

Therefore, the correction term facilitates an improvement in performance, such as by reducing the amount of computing resources or time used while reducing the number of collisions with surrounding entities. One benefit of calculating and implementing the correction term includes a performance increase over merely utilizing decomposition to scale the strategy associated with the single pedestrian to mitigate collisions with multiple pedestrians. Additionally, utilization of the correction term also provides a performance increase over training a policy on a full scale without implementing utility decomposition.

Figure 2:
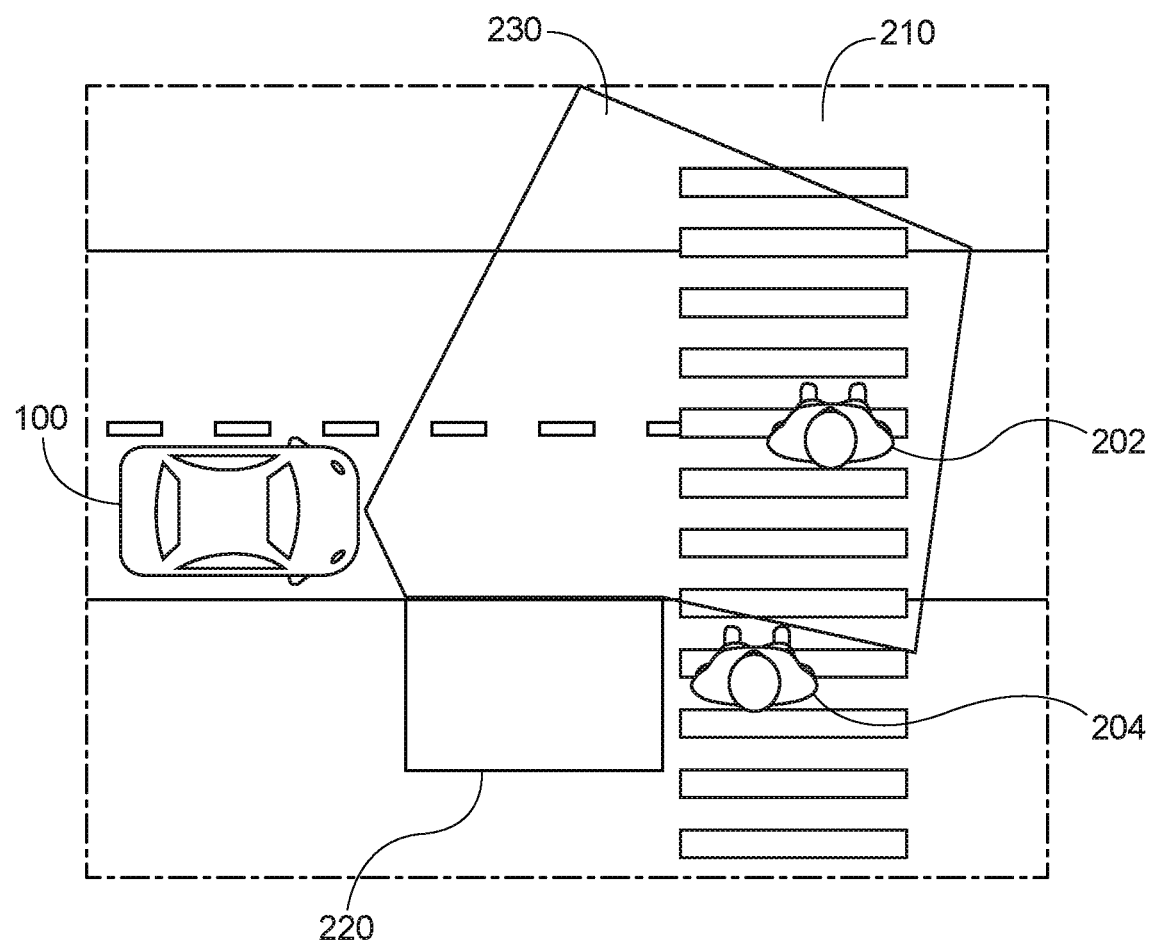
FIG. 2 is an exemplary usage scenario for the system for utility decomposition with deep corrections of FIG. 1, according to one aspect.

FIG. 2 is an exemplary usage scenario for the system 100 for utility decomposition with deep corrections of FIG. 1, according to one aspect. In FIG. 2, there is a first pedestrian 202 and a second pedestrian 204 walking through a crosswalk 210. Due to the occlusion object 220, the second pedestrian 204 may not be visible to the sensor(s) 130 of the system 100 for utility decomposition with deep corrections. For example, an observable area may be the area 230. In this example, the system 100 for utility decomposition with deep corrections may assign an $s_{absent}$ value to the second pedestrian 204 (e.g., second entity) for the velocity and position associated with the second pedestrian 204. The first pedestrian 202 (e.g., first entity) may be assigned a first entity velocity and a first entity position, as determined by the sensor 130 of the system 100 for utility decomposition with deep corrections.

FIGS. 3A-3B are graphical representations of exemplary policies or rules derived from utility decomposition, as implemented by the system 100 for utility decomposition with deep corrections of FIG. 1, according to one aspect. For example, FIG. 3A illustrates an exemplary policy based on the max-sum function of Equation 3a. FIG. 3A illustrates an exemplary policy based on the max-sum function of Equation 3a along with a correction term.

FIGS. 4A-4B are graphical representations of exemplary policies or rules derived from utility decomposition, as implemented by the system 100 for utility decomposition with deep corrections of FIG. 1, according to one aspect. For example, FIG. 4A illustrates an exemplary policy based on the max-min function of Equation 3b. FIG. 4A illustrates an exemplary policy based on the max-min function of Equation 3b along with a correction term.

Figure 5:
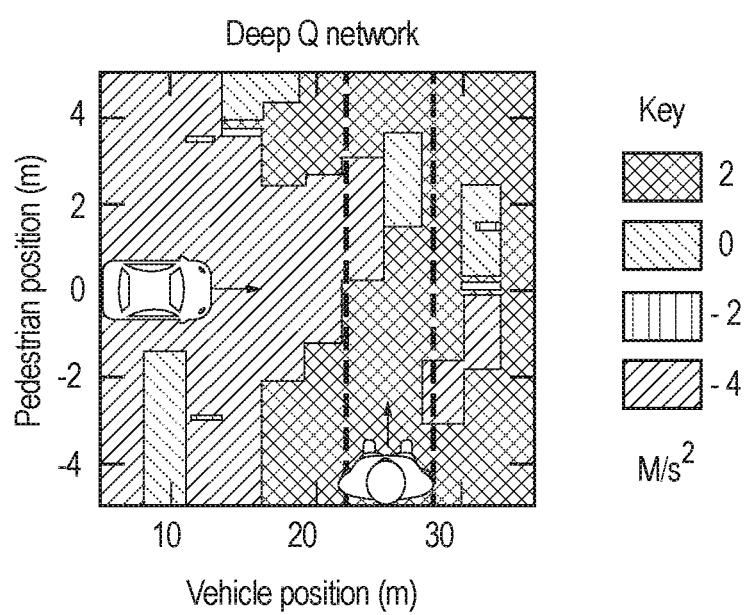
FIG. 5 is a graphical representation of an exemplary policy or rule derived from utility decomposition, as implemented by the system for utility decomposition with deep corrections of FIG. 1, according to one aspect.

FIG. 5 is a graphical representation of an exemplary policy or rule derived from utility decomposition, merely using Equations 4-5, as implemented by the system 100 for utility decomposition with deep corrections of FIG. 1, according to one aspect.

Figure 6:
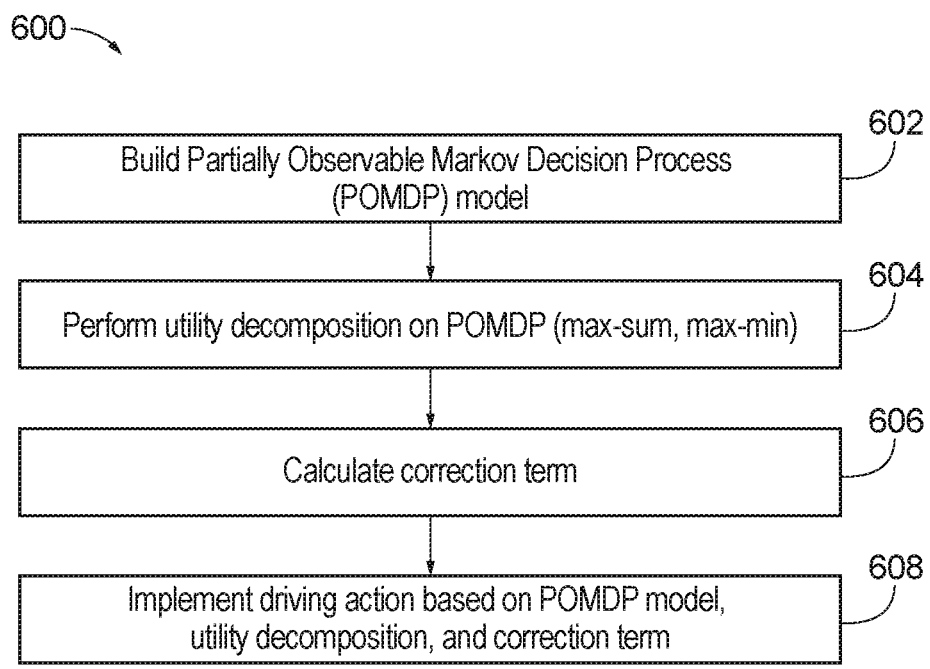
FIG. 6 is a flow diagram of method for operating an autonomous vehicle based on utility decomposition with deep corrections.

FIG. 6 is a flow diagram of method 600 for operating an autonomous vehicle based on utility decomposition with deep corrections. According to one aspect, the method 600 may include building 602 a Partially Observable Markov Decision Process (POMDP) model, performing 604 utility decomposition on POMDP (max-sum, max-min), calculating 606 a correction term, and implementing 608 a driving action based on POMDP model, utility decomposition, and correction term.

Figure 7:
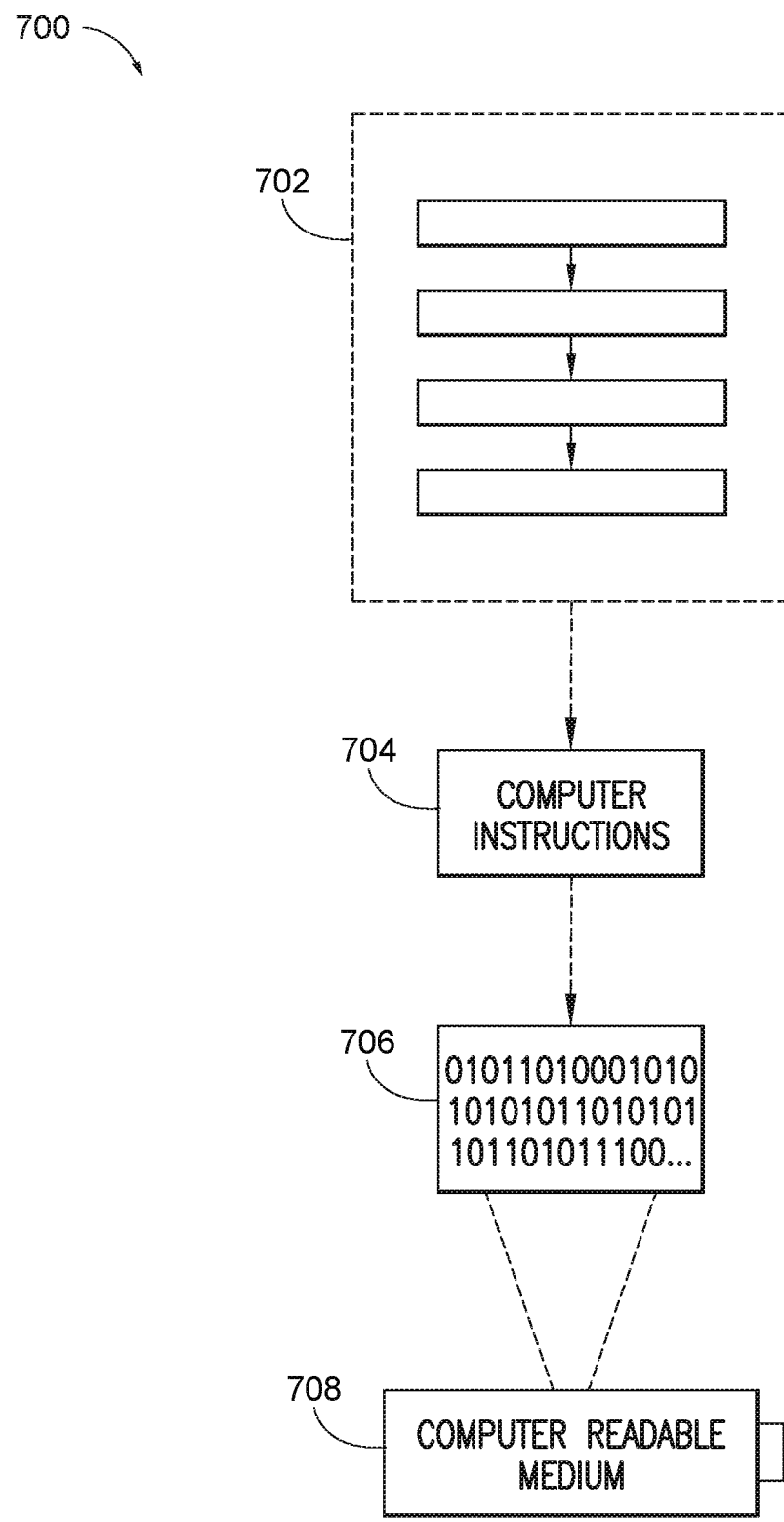
FIG. 7 is an illustration of an example computer-readable medium or computer-readable device including processor-executable instructions configured to embody one or more of the provisions set forth herein, according to one or more embodiments.

Still another aspect involves a computer-readable medium including processor-executable instructions configured to implement one aspect of the techniques presented herein. An embodiment of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This encoded computer-readable data 706, such as binary data including a plurality of zero's and one's as shown in 706, in turn includes a set of processor-executable computer instructions 704 configured to operate according to one or more of the principles set forth herein. In one such aspect of the implementation 700, the processor-executable computer instructions 704 may be configured to perform a method 702, such as the method 600 of FIG. 6. In another aspect, the processor-executable computer instructions 704 may be configured to implement a system, such as the system 100 of FIG. 1. Many such computer-readable media may be devised by those of ordinary skill in the art that are configured to operate in accordance with the techniques presented herein.

As used in this application, the terms "component", "module", "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
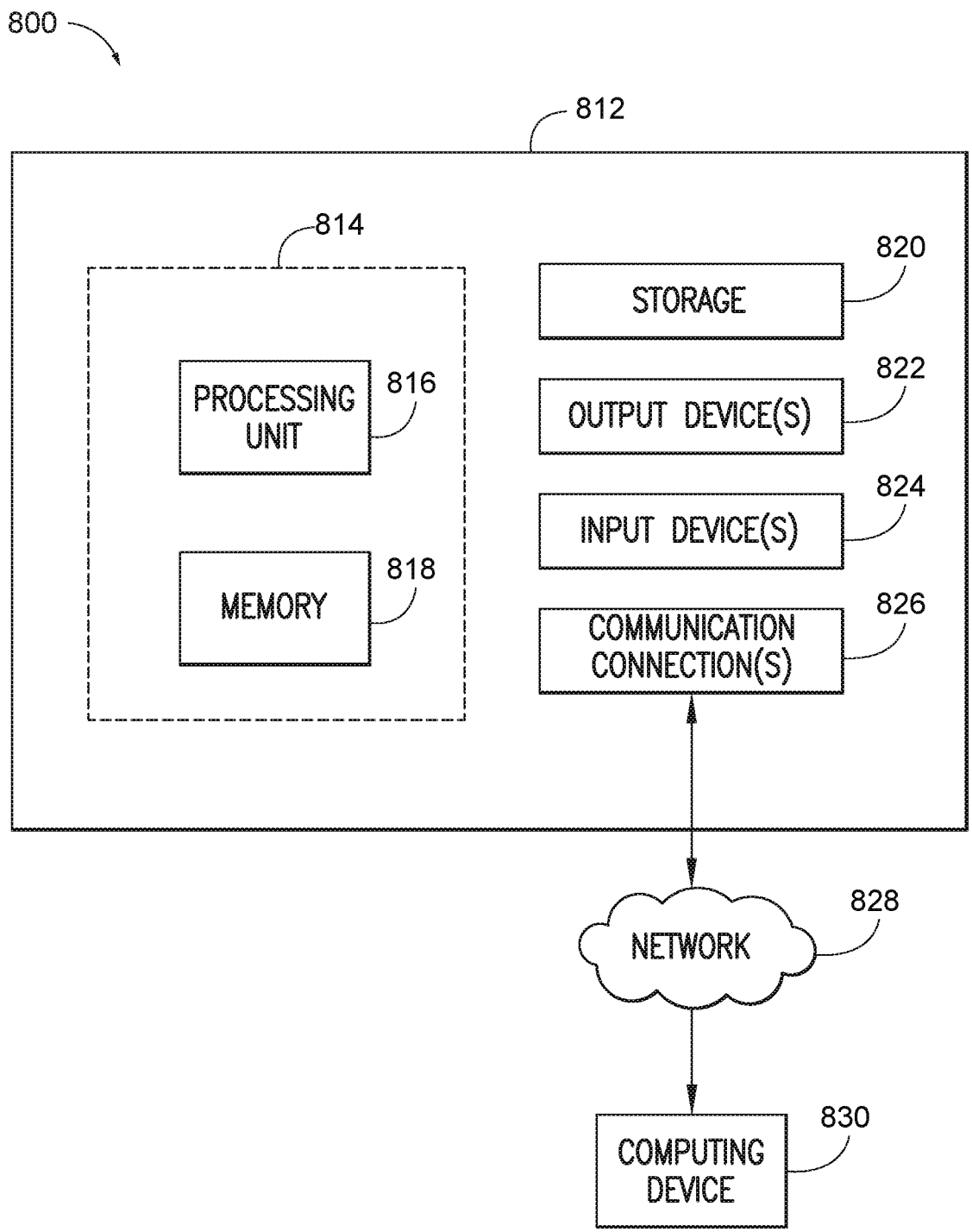
FIG. 8 is an illustration of an example computing environment where one or more of the provisions set forth herein are implemented, according to one or more embodiments.

FIG. 8 and the following discussion provide a description of a suitable computing environment to implement embodiments of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one aspect provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other embodiments, computing device 812 includes additional features or functionality. For example, computing device 812 may include additional storage such as removable storage or non-removable storage, including, but not limited to, magnetic storage, optical storage, etc. Such additional storage is illustrated in FIG. 8 by storage 820. In one aspect, computer readable instructions to implement one aspect provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by computing device 812. Any such computer storage media is part of computing device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Computing device 812 includes input device(s) 824 such as keyboard, mouse, pen, voice input device, touch input device, infrared cameras, video input devices, or any other input device. Output device(s) 822 such as one or more displays, speakers, printers, or any other output device may be included with computing device 812. Input device(s) 824 and output device(s) 822 may be connected to computing device 812 via a wired connection, wireless connection, or any combination thereof. In one aspect, an input device or an output device from another computing device may be used as input device(s) 824 or output device(s) 822 for computing device 812. Computing device 812 may include communication connection(s) 826 to facilitate communications with one or more other devices 830, such as through network 828, for example.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An autonomous vehicle including a system for utility decomposition with deep corrections, comprising:
    a sensor detecting a first entity within an environment through which the autonomous vehicle is travelling, a first current velocity associated with the first entity, and a first current position associated with the first entity and a second entity within the environment, a second current velocity associated with the second entity, and a second current position associated with the second entity;
    a controller receiving a current velocity associated with the autonomous vehicle, a current position associated with the autonomous vehicle, and a target position for the autonomous vehicle;
    a model generator building a Partially Observable Markov Decision Process (POMDP) model of the environment based on the first current velocity of the first entity, the first current position of the first entity, the second current velocity of the second entity, the second current position of the first entity, the current velocity of the autonomous vehicle, and the current position of the autonomous vehicle;
    a decomposition unit decomposing a task associated with travelling from the current position associated with the autonomous vehicle to the target position into a first sub-task associated with the first entity and a second sub-task associated with the second entity and solving respective sub-tasks individually;
    a correction generator generating a correction term based on a low-fidelity model associated with prior knowledge and a surrogate correction; and
    a drive controller implementing a driving parameter for a component of the autonomous vehicle based on the POMDP model and the correction term.

2. The autonomous vehicle including the system for utility decomposition with deep corrections of claim 1, wherein the controller assigns an $s_{absent}$ value to the first current velocity of the first entity and the first current position of the first entity based on the sensor detecting that the first entity is occluded from view.

3. The autonomous vehicle including the system for utility decomposition with deep corrections of claim 1, wherein the model generator builds the POMDP model based on a k-Markov approximation.

4. The autonomous vehicle including the system for utility decomposition with deep corrections of claim 1, wherein the model generator builds the POMDP model as a tuple (S, $\mathcal{A}$, T, $\mathcal{R}$, γ), wherein S is a state space, $\mathcal{A}$ is an action space, T is a state transition function, $\mathcal{R}$ is a reward function, and γ is a discount factor.

5. The autonomous vehicle including the system for utility decomposition with deep corrections of claim 4, wherein the state space includes the first current velocity of the first entity, the first current position of the first entity, the second current velocity of the second entity, the second current position of the first entity, the current velocity of the autonomous vehicle, and the current position of the autonomous vehicle.

6. The autonomous vehicle including the system for utility decomposition with deep corrections of claim 4, wherein the action space is a set of actions including a hard braking action, a moderate braking action, maintaining velocity, and an acceleration action.

7. The autonomous vehicle including the system for utility decomposition with deep corrections of claim 4, wherein the state transition function T is modeled as a transition model based on a point mass model for the autonomous vehicle and a constant velocity model with random noise for the respective first and second entities.

8. The autonomous vehicle including the system for utility decomposition with deep corrections of claim 1, wherein the decomposition unit approximates a value function associated with the task based on summing one or more individual value functions or based on selecting a minimum associated with each entity.

9. The autonomous vehicle including the system for utility decomposition with deep corrections of claim 8, wherein the value function is represented by a deep Q-network (DQN).

10. The autonomous vehicle including the system for utility decomposition with deep corrections of claim 1, wherein the sensor is a light detection and ranging (LIDAR) sensor or an image capture sensor.

11. An autonomous vehicle including a system for utility decomposition with deep corrections, comprising:
a sensor detecting a first entity within an environment through which the autonomous vehicle is travelling, a first current velocity associated with the first entity, and a first current position associated with the first entity;
a controller receiving a current velocity associated with the autonomous vehicle, a current position associated with the autonomous vehicle, and a target position for the autonomous vehicle;
a model generator building a Partially Observable Markov Decision Process (POMDP) model of the environment based on the first current velocity of the first entity, the first current position of the first entity, the current velocity of the autonomous vehicle, and the current position of the autonomous vehicle;
a decomposition unit decomposing a task associated with travelling from the current position associated with the autonomous vehicle to the target position into a first sub-task and a second sub-task and solving respective sub-tasks individually;
a correction generator generating a correction term based on a low-fidelity model associated with prior knowledge and a surrogate correction; and
a drive controller implementing a driving parameter for a component of the autonomous vehicle based on the POMDP model and the correction term.

12. The autonomous vehicle including the system for utility decomposition with deep corrections of claim 11, wherein the controller assigns an $s_{absent}$ value to the first current velocity of the first entity and the first current position of the first entity based on the sensor detecting that the first entity is occluded from view.

13. The autonomous vehicle including the system for utility decomposition with deep corrections of claim 11, wherein the model generator builds the POMDP model based on a k-Markov approximation.

14. The autonomous vehicle including the system for utility decomposition with deep corrections of claim 11, wherein the model generator builds the POMDP model as a tuple (S, $\mathcal{A}$, T, $\mathcal{R}$, γ), wherein S is a state space, $\mathcal{A}$ is an action space, T is a state transition function, $\mathcal{R}$ is a reward function, and γ is a discount factor.

15. The autonomous vehicle including the system for utility decomposition with deep corrections of claim 14, wherein the state space includes the first current velocity of the first entity, the first current position of the first entity, the current velocity of the autonomous vehicle, and the current position of the autonomous vehicle.

16. The autonomous vehicle including the system for utility decomposition with deep corrections of claim 14, wherein the action space is a set of actions including a hard braking action, a moderate braking action, maintaining velocity, and an acceleration action.

17. A method for utility decomposition with deep corrections, comprising:
detecting a first entity within an environment through which an autonomous vehicle is travelling, a first current velocity associated with the first entity, and a first current position associated with the first entity;
receiving a current velocity associated with the autonomous vehicle, a current position associated with the autonomous vehicle, and a target position for the autonomous vehicle;
building a Partially Observable Markov Decision Process (POMDP) model of the environment based on the first current velocity of the first entity, the first current position of the first entity, the current velocity of the autonomous vehicle, and the current position of the autonomous vehicle;
decomposing a task associated with travelling from the current position associated with the autonomous vehicle to the target position into a first sub-task and a second sub-task and solving respective sub-tasks individually;
generating a correction term based on a low-fidelity model associated with prior knowledge and a surrogate correction; and
implementing a driving parameter for a component of the autonomous vehicle based on the POMDP model and the correction term to operate the autonomous vehicle autonomously.

18. The method for utility decomposition with deep corrections of claim 17, comprising assigning an $s_{absent}$ value to the first current velocity of the first entity and the first current position of the first entity based on the sensor detecting that the first entity is occluded from view.

19. The method for utility decomposition with deep corrections of claim 17, comprising building the POMDP model based on a k-Markov approximation.

20. The method for utility decomposition with deep corrections of claim 17, comprising building the POMDP model as a tuple (S, $\mathcal{A}$, T, $\mathcal{R}$, γ), wherein S is a state space, $\mathcal{A}$ is an action space, T is a state transition function, $\mathcal{R}$ is a reward function, and γ is a discount factor.

* * * * *